(12) United States Patent
Minami

(10) Patent No.: US 6,823,661 B2
(45) Date of Patent: Nov. 30, 2004

(54) DIESEL ENGINE EXHAUST PURIFYING DEVICE

(75) Inventor: Toshitaka Minami, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 10/333,634

(22) PCT Filed: May 23, 2002

(86) PCT No.: PCT/JP02/04974
§ 371 (c)(1),
(2), (4) Date: Jan. 23, 2003

(87) PCT Pub. No.: WO02/095197
PCT Pub. Date: Nov. 28, 2002

(65) Prior Publication Data
US 2003/0172644 A1 Sep. 18, 2003

(30) Foreign Application Priority Data
May 24, 2001 (JP) ........................................ 2001-155895

(51) Int. Cl.[7] ................................................ F01N 3/00
(52) U.S. Cl. ............................. 60/285; 60/274; 60/284; 60/295; 123/90.15; 123/90.19; 123/90.23
(58) Field of Search .......................... 60/274, 284, 285, 60/286, 295, 297; 123/90.15, 90.23, 90.19

(56) References Cited

U.S. PATENT DOCUMENTS

| | | | | |
|---|---|---|---|---|
| 5,967,114 A | * | 10/1999 | Yasuoka | 123/295 |
| 6,240,723 B1 | * | 6/2001 | Ito et al. | 60/278 |
| 6,394,051 B1 | * | 5/2002 | Filipe et al. | 123/90.15 |
| 6,439,210 B1 | * | 8/2002 | Faletti et al. | 123/568.14 |
| 6,519,933 B2 | * | 2/2003 | Ogiso et al. | 60/285 |
| 6,526,745 B1 | * | 3/2003 | Ogiso | 60/285 |

* cited by examiner

Primary Examiner—Binh Q. Tran
(74) Attorney, Agent, or Firm—James N. Dresser, Esq

(57) ABSTRACT

A device for purifying exhaust gas of a diesel engine equipped with a continuous regeneration type diesel particulate filter arranged in the exhaust gas passage of the engine. The device includes an intake air shutter arranged in the intake air passage of the engine, an exhaust gas temperature region detector for detecting an exhaust gas temperature region of the engine, a controller for controlling the opening degree of the intake air shutter when the exhaust gas temperature region of the engine, detected by the exhaust gas temperature region detector, is lower than a predetermined temperature region, and an exhaust valve-operating mechanism equipped with an exhaust gas introduction mechanism for opening the exhaust valve of the engine for a short period of time during the intake stroke of a cylinder of the diesel engine, to introduce exhaust gas into the cylinder.

16 Claims, 7 Drawing Sheets

VALVE LIFT CURVE

MAP OF EXHAUST GAS TEMP. REGIONS

LOW ← ENGINE ROTATIONAL SPEED → HIGH

CONTROL MAP BASED ON THE EXHAUST TEMP. REGIONS

| REGION | INTAKE AIR SHUTTER | EXHAUST GAS SHUTTER |
|---|---|---|
| X | FULLY OPEN | FULLY OPEN |
| Y | FULLY OPEN | FULLY OPEN |
| Z | CONTROL OF OPENING – DEGREE BASED ON INTAKE AIR SHUTTER OPENING – DEGREE MAP | CONTROL OF OPENING – DEGREE BASED ON EXHAUST GAS SHUTTER OPENING – DEGREE MAP |

DIESEL ENGINE EXHAUST PURIFYING DEVICE

TECHNICAL FIELD

The present invention relates to a device for purifying exhaust gas of diesel engines for removing particulate matters from the exhaust gas.

BACKGROUND ART

Regulations against the exhaust gases of diesel engines mounted on vehicles are becoming stringent year after year. In particular, it is becoming an urgent necessity to decrease the particulate matters (hereinafter abbreviated as PMs) which consists of carbon as a main component. As a device for removing the PMs from the exhaust gas, there has been known a diesel particulate filter (hereinafter abbreviated as DPF), and a trend toward obligatorily furnishing the vehicles mounting diesel engines with the DPF becomes also serious.

The DPF with which the diesel engine mounted on the vehicle is furnished must be regenerated by burning the PMs that have been trapped because the PMs deposit on the DPF due to repetitive operation of the engine. As a means for regeneration of the DPF, there is a method to burn the PMs by heating them with an electric heater, a burner or the like. According to this method, a system that a plurality of DPFs are arranged in parallel in the exhaust gas passage to alternately conduct the trapping and the burning is constituted. As another means for regenerating the DPF, there has also been studied a so-called continuous regeneration type DPF according to which an oxidizing catalyst is disposed in the exhaust gas passage on the upstream side of the DPF, NO in the exhaust gas is oxidized into $NO_2$ by the oxidizing catalyst, and the PMs are continuously burned with $NO_2$ while trapping the PMs as disclosed in, for example, Japanese Patent No. 3012249. Further, as another continuous regeneration type DPF, there has been known a method in which a NOx occluding/reducing catalyst is carried on the DPF and the PMs trapped are continuously burned by using active oxygen that generates when the NOx is occluded and reduced, as disclosed in Japanese Patent No. 2600492. In both of these continuous regeneration type DPFs, the PMs burn in a low temperature region of 250 to 400° C. (which may shift up and down to some extent depending on the material of the catalyst) without requiring any particular heating means such as electric heater, burner or the like, giving such an advantage that the devices as a whole can be constructed simply and in a compact size.

Although it has been thus made possible to burn the PMs in a range of a so-called active temperature region of the catalyst, which can be easily accomplished by the exhaust gas temperature of the engine as described above, there may occur an operation condition that does not lie in this temperature range depending on the operation conditions of the engine. When the engine operates under a low-load condition, in particular, there occurs a case where the temperature of the exhaust gas does not rise and often fails to reach 250° C., while during a high-load operation condition, too, there is a case where the exhaust gas temperature often exceeds the active temperature region and the PMs cannot often be burned continuously.

In the above cases, when according to the operation conditions, the temperature of the exhaust gas does not come into the active temperature region of the catalyst and the PMs trapped by the DPF do not burn, the PMs that do not burn remain trapped by the DPF and accumulate thereon. Then, when the engine operation condition changes and the temperature of the exhaust gas comes into the active temperature region of the catalyst, the PMs accumulated burn due to the action described above. At this moment, if the accumulated PMs start burning all at once, the temperature of combustion of PMs becomes as high as 2000° C. causing such problems as melt-damage or the like to the filter body.

As described above, the continuous regeneration type DPF continuously conducts the regeneration when the exhaust gas is emitted while the PMs being trapped. Therefore, if the DPF can be continuously regenerated at all times whenever the engine is in operation, then, the temperature does not reach so high a temperature as to cause melt-damage. Because of this reason, it is important to maintain the temperature of the exhaust gas to lie within the active temperature region of the catalyst at all times.

By taking the above problems into consideration, the present applicant has proposed Japanese Patent Applications Nos. 2000-185897 and 2001-79266 in an attempt to maintain the temperature of the exhaust gas in the active temperature region of the catalyst.

The inventions of the above two applications were proposed based on a knowledge that the temperature of the exhaust gas is greatly affected by the amount of the air taken in the cylinder of the engine, and it becomes high as the excess air ratio ($\lambda$), which it the ratio of the excess air to the fuel, approaches $\lambda=1$ from a large state and as the temperature of the air taken in the cylinder becomes high (the temperature of the exhaust gas becomes low if they are reversed).

That is, Japanese Patent Application No. 2000-185897 discloses that there are arranged an intake throttle valve and a variable supercharger as air amount adjusting means, and the temperature of the exhaust gas is controlled by squeezing the intake throttle valve to decrease the amount of the intake air and by controlling the variable supercharger to increase the amount of the intake air.

Further, Japanese Patent Application No. 2001-79266 discloses that there are provided a so-called EGR passage communicating the exhaust gas passage of the engine with the intake air passage and an EGR valve for controlling the passage area of the EGR passage, and the temperature of the exhaust gas is controlled by controlling the flow rate of the EGR gas refluxed from the exhaust gas reflux (EGR) passage to the intake air passage side and by further controlling the amount of the intake air by the intake air shutter in the intake air passage and by the exhaust gas shutter in the exhaust gas passage.

In a diesel engine, the amount of the intake air is not usually controlled, and the excess air ratio ($\lambda$) becomes large as the load is low, i.e., when the fuel is injected in small amounts, and becomes $\lambda=10$ or larger during the idling operation. To bring the excess air ratio ($\lambda$) close to 1, therefore, the amount of the intake air must be squeezed to a considerable degree.

Meanwhile, as is well known, the diesel engine is a combustion system based on the self-ignition by the compression. That is, the intake air is compressed based on the compression ratio of the cylinder defined by a bore of the cylinder and the stroke of the piston, the fuel is injected into the cylinder in which the temperature has been raised due to the compression and hence, the temperature of the fuel itself is elevated, so that the fuel is self-ignited while being vaporized. Therefore, the above method of decreasing the amount of the intake air hinders the elevation of the temperature of the intake air by the compression and produces a condition where the self-ignition does not easily take place. Namely, the above method arouses a new problem inducing incomplete combustion in the cylinder and emitting unburned HC (hydrocarbons).

FIG. 9 is a graph illustrating the effect produced as a result of squeezing the intake air shutter, in which the ordinate represents the exhaust gas temperature (° C.) and HC (×100 ppm) and the abscissa represents the amount of the intake air [kg/h]. The amount of the intake air is limited by squeezing the intake air shutter stepwise. Solid lines in the graph represent a change in the exhaust gas temperature and the HC contained in the exhaust gas in the prior art, that were measured by operating the intake air shutter only. The data of FIG. 9 were measured by using a 4-cylinder 3-liter diesel engine while driving it at a rotational speed (Ne) of 1000 rpm, injecting the fuel at a rate (Q) of 10 $mm^3$/st and measuring the exhaust gas temperature at the outlet of the exhaust manifold.

As will be obvious from FIG. 9, the exhaust gas temperature is about 150° C. when the intake air shutter is not squeezed. The exhaust gas temperature gradually increases as the intake air shutter is gradually squeezed. However, the HC sharply increases as the amount of the intake air approaches 80 kg/h. In a region where the amount of the intake air lies between 70 and 80 kg/h, there takes place an abnormal combustion permitting HC to be emitted in amounts of exceeding 10,000 ppm. Then, the exhaust gas is spewed out as white smoke from the exhaust pipe, the combustion is no longer normally conducted, and the exhaust gas temperature is not raised any more no matter how the intake air shutter is squeezed. Therefore, the intake air shutter alone is not enough for raising the exhaust gas temperature to a sufficient degree.

The present invention has been accomplished in view of the above-mentioned points, and its principal technical assignment is to provide an improved device for purifying exhaust gas of diesel engines mounting a continuous regeneration type DPF by raising the exhaust gas temperature even under operation conditions where the exhaust gas temperature is low without deteriorating the fuel efficiency and by promoting the continuous combustion of PMs in the continuous regeneration type DPF, so that the PMs will not be deposited on the DPF.

DISCLOSURE OF THE INVENTION

In order to solve the above-mentioned technical assignment, according to the present invention, there is provided a device for purifying exhaust gas of a diesel engine equipped with a continuous regeneration type diesel particulate filter arranged in the exhaust gas passage of the engine, comprising:

an intake air shutter arranged in the intake air passage of the engine;

an exhaust gas temperature region detecting means for detecting an exhaust gas temperature region of the engine;

a control means for squeezing the opening degree of said intake air shutter when the exhaust gas temperature region of the engine, detected by said exhaust gas temperature region detecting means, is lower than a predetermined temperature region; and an exhaust valve-operating mechanism equipped with an exhaust gas introduction mechanism for opening the exhaust valve of the engine for a short period of time during the intake stroke.

In order to solve the above-mentioned technical assignment according to the present invention, there is further provided a device for purifying exhaust gas of a diesel engine equipped with a continuous regeneration type diesel particulate filter arranged in the exhaust gas passage of the engine, comprising:

an intake air shutter arranged in the intake air passage of the engine;

an exhaust gas introduction mechanism for opening the exhaust gas passage to the cylinder during the intake stroke;

an exhaust gas temperature region detecting means for detecting the exhaust gas temperature region of the engine; and a control means for squeezing the opening degree of the intake air shutter and for operating said exhaust gas introduction mechanism when the exhaust gas temperature region of the engine, detected by said exhaust gas temperature region detecting means, is lower than a predetermined temperature region.

It is desired that when the exhaust gas temperature region of the engine detected by the exhaust gas temperature region detecting means is lower than a predetermined temperature region, said control means controls stepwise so as to decrease the opening degree of said intake air shutter as the temperature region becomes low.

It is further desired that an exhaust gas shutter arranged in the exhaust gas passage and for squeezing the exhaust gas passage is provided, and the control means controls so as to squeeze the opening degree of the exhaust gas shutter when the exhaust gas temperature region detected by the exhaust gas temperature region detecting means is in a low temperature region. The opening degree of the exhaust gas shutter is controlled stepwise to be decreased as the temperature region becomes low.

BEST MODE FOR CARRYING OUT THE INVENTION

Embodiments of the present invention will be described below with reference to the drawings.

Figure 1:
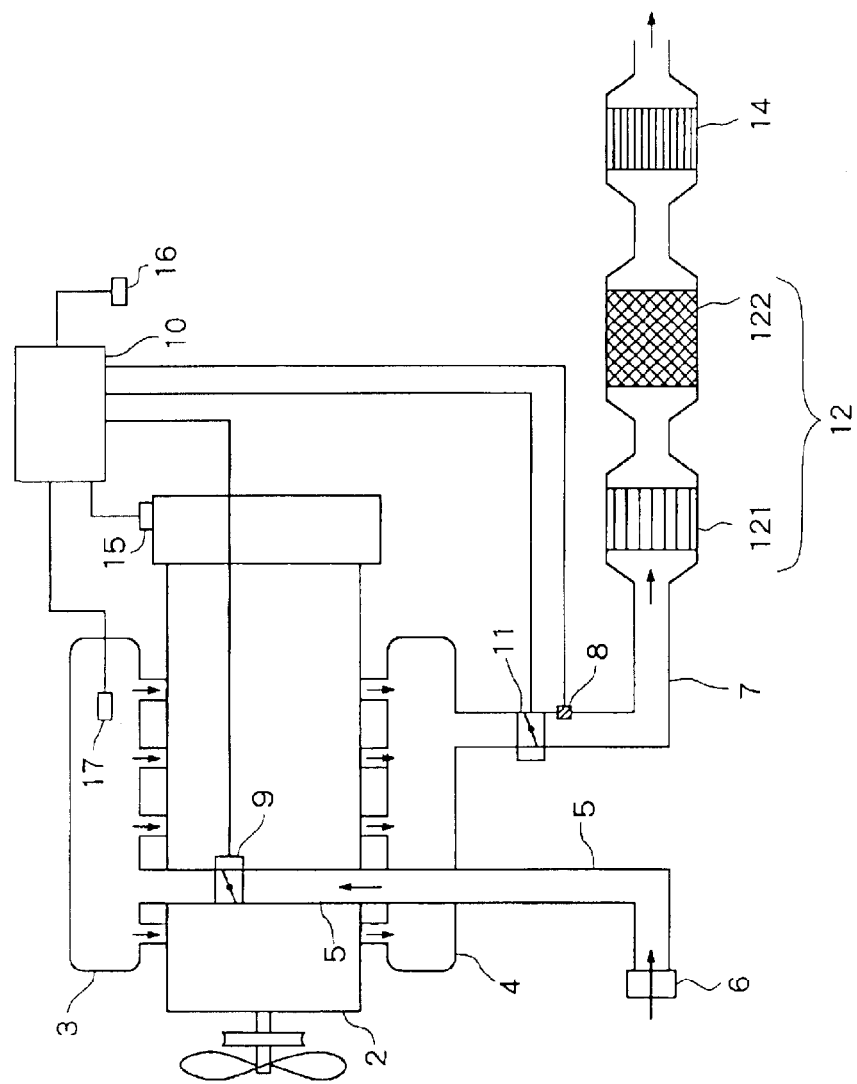
FIG. 1 is a block diagram illustrating the constitution of a device for purifying exhaust gas of diesel engines constituted according to the present invention.
Figure 2:
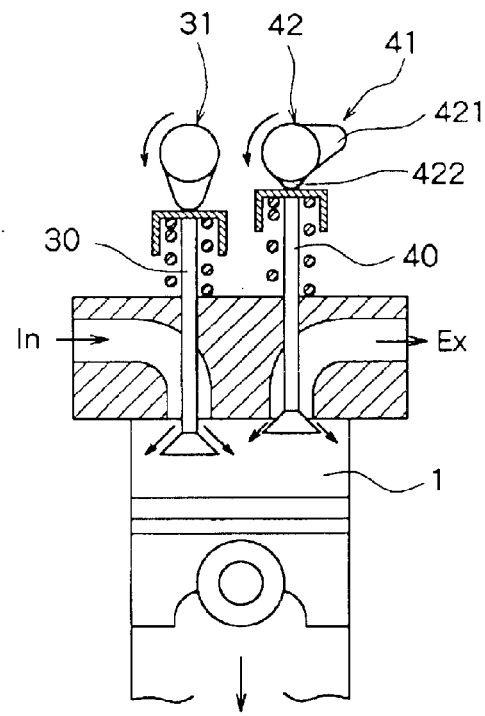
FIG. 2 is a diagram illustrating an exhaust gas introduction mechanism according to an embodiment of the present invention.

An engine body 2 constituted by a cylinder block, a cylinder head and the like shown in FIG. 1 is provided with an intake manifold 3 constituting part of the intake air passage and with an exhaust manifold 4 constituting part of the exhaust gas passage. An intake pipe 5 constituting part of the intake air passage is connected to the intake manifold 3, and an air cleaner 6 is arranged in the uppermost stream portion of the intake pipe 5 to clean the intake air. The intake air cleaned through the air cleaner 6 passes through the intake pipe 5 and is fed into the cylinder 1 as shown in FIG. 2 through the intake manifold 3. An exhaust pipe 7 constituting part of the exhaust gas passage is connected to the exhaust manifold 4, and the exhaust gas produced in the cylinder 1 is discharged through the exhaust manifold 4 and the exhaust pipe 7. An intake air shutter 9 is arranged in the intake pipe 5, and an exhaust gas shutter 11 is disposed in the exhaust pipe 7. The intake air shutter 9 and the exhaust gas shutter 11 are respectively provided with an air actuator connected to an air tank that is not shown, and these actuators are controlled by a control means 10.

In the exhaust pipe 7 of the illustrated diesel engine, there are arranged a continuous regeneration type diesel particulate filter (continuous regeneration type DPF) 12 comprising an oxidizing catalyst 121 and a DPF 122, as well as a NOx catalyst 14 which are arranged in this order from the upstream side. The oxidizing catalyst 121 used is the one prepared by coating active alumina or the like on the surface of a carrier formed of, for example, honeycomb-like cordierite or a heat resistant steel to form a wash coat layer and having a catalytically active component of a noble metal such as platinum, palladium or rhodium carried on the coated layer. This oxidizing catalyst 121 oxidizes NO in the exhaust gas to form $NO_2$ and oxidizes HC and CO in the exhaust gas to form $H_2O$ and $CO_2$. The DPF 122 may be, for example, a honeycomb filter of the so-called wall-flow type in which a number of porous cells are formed in parallel using cordierite or silicon carbide, the inlets and outlets of the cells being alternately closed, or a fiber-type filter in which ceramic fibers are wound in many layers on a stainless steel porous pipe, to trap the PMs contained in the exhaust gas. The NOx catalyst 14 has the constitution and components similar to those of the oxidizing catalyst 121, and reduces NOx such as NO or the like contained in the exhaust gas into $N_2$ and $H_2O$. Such continuous regeneration type DPF 12 works to oxidize NO in the exhaust gas into $NO_2$ by the oxidizing catalyst 121 and to burn the trapped PMs by using $NO_2$ that flows into the DPF 122 arranged on the downstream side of the oxidizing catalyst 121. Here, the PMs burn at a low temperature which is not higher than 400° C. without requiring any special heating means such as an electric heater, a burner or the like. Since while the PMs are continuously burned at a low temperature, the PMs are newly trapped at the same time, the device as a whole is constructed simply and in a compact size advantageously.

The illustrated diesel engine comprises an engine rotational speed (Ne) sensor 15 for detecting a rotational speed of the engine, an accelerator sensor 16 for detecting an accelerator pedal depression amount (accelerator opening degree: ACL), an intake air temperature sensor 17 arranged in the intake manifold 3 and for detecting the temperature of the air taken in the cylinder, an exhaust gas temperature sensor 8 arranged in the exhaust pipe 7 and for detecting the exhaust gas temperature, and a control means 10 for controlling the amount of fuel to be injected into the cylinder by a fuel injection device (not shown) based on detection signals from the above sensors. The control means has a memory storing a map of fuel injection amounts (not shown), in which the amounts of fuel injection are set using the engine rotational speed and the accelerator opening degree as parameters, and determines a basic amount of fuel injection based on detection signals from the engine rotational speed sensor 15 and from the accelerator sensor 16. Further, the control means 10 corrects the basic amount of fuel injection based on a value detected by the intake air temperature sensor 17 to determine a final amount of fuel injection. Here, the final amount of fuel injection can be corrected at any time by making reference to not only the intake air temperature but also a variety of other parameters (atmospheric pressure, smoke-limit injection amount, etc.).

Figure 3:
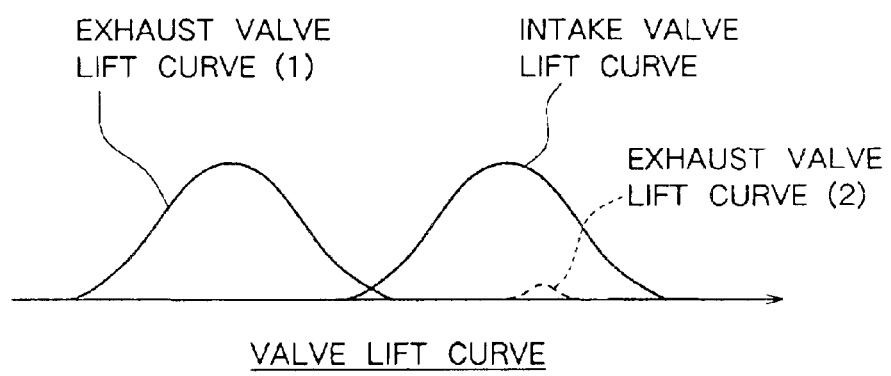
FIG. 3 is a diagram illustrating lift curves of an intake valve and an exhaust valve in the constitution of FIG. 2.

Referring to FIG. 2, the diesel engine of this embodiment has an exhaust gas introduction mechanism (so-called exhaust two-step cam mechanism) that works to open the exhaust gas passage of the cylinder to the cylinder during the intake stroke. FIG. 2 illustrates an intake valve 30, an intake valve-operating mechanism 31, an exhaust valve 40 and an exhaust valve-operating mechanism 41. An exhaust cam 42 constituting the exhaust valve-operating mechanism 41 includes a normal cam profile 421 for operating the exhaust valve 40 in the exhaust stroke, and an exhaust introduction cam profile 422 formed at a phase angle of about 90 degrees behind the cam profile 421 in the direction of rotation. The thus constituted exhaust cam 42 operates, as shown in FIG. 3, the exhaust valve 40 in compliance with an exhaust valve lift curve (1) of the cam profile 421 and in compliance with an exhaust valve lift curve (2) of the exhaust introduction cam profile 422 which lasts for only a short period of time during the intake stroke (during the intake valve lift curve of the intake valve-operating mechanism 31). In the embodiment shown in FIG. 2, therefore, the exhaust introduction cam profile 422 formed on the exhaust cam 42 works as an exhaust gas introduction mechanism for introducing the exhaust gas into the cylinder during the intake stroke. The amount of lifting the exhaust valve 40 by the exhaust introduction cam profile 422 may be about 1 to 3 mm.

Next, another embodiment of the exhaust gas introduction mechanism will be described with reference to FIG. 4. In the embodiment shown in FIG. 4, the same members as those of the embodiment of FIG. 2 are denoted by the same reference numerals and hence, are not described here again in detail.

Figure 4:
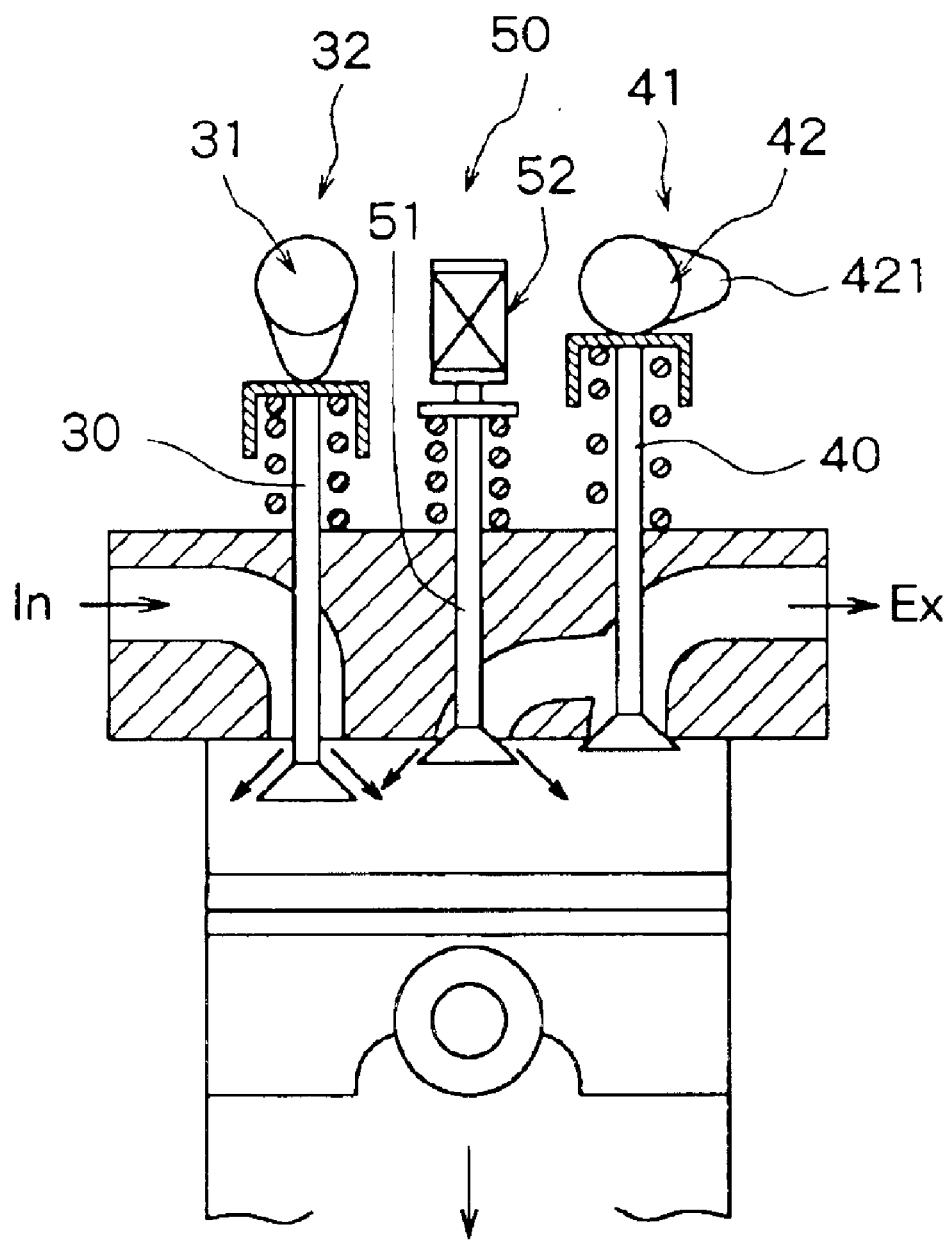
FIG. 4 is a diagram illustrating an exhaust gas introduction mechanism according to another embodiment of the present invention.

In the embodiment shown in FIG. 4, the exhaust cam 42 constituting the exhaust valve-operating mechanism 41 has the normal cam profile 421 only. An exhaust gas introduction mechanism 50 of the embodiment shown in FIG. 4 comprises an exhaust gas introduction valve 51 for opening the exhaust gas passage of the cylinder to the same cylinder during the intake stroke, and an electromagnetic solenoid 52 for operating the exhaust gas introduction valve 51. When the exhaust gas temperature region of the engine equipped with the thus constituted exhaust gas introduction mechanism 50 is lower than a predetermined temperature region, a control signal is sent, as a drive signal, from the control means 10 to the electromagnetic solenoid 52 causing the exhaust gas introduction valve 51 to be opened to drive during the intake stroke.

In the embodiment shown in FIG. 1, there is provided with an exhaust gas temperature region detecting means for detecting the exhaust gas temperature region of the diesel engine. The exhaust gas temperature region detecting means will now be described.

Figures 5, 6:
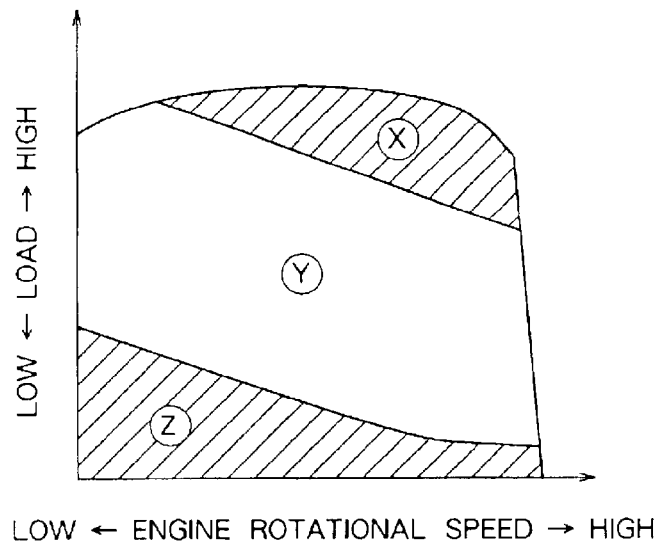
FIG. 5 is a map of exhaust gas temperature regions according to the present invention.
FIG. 6 is a control map depending on the exhaust gas temperature regions according to the present invention.

The exhaust gas temperature of the engine is determined chiefly by the amount of fuel (load) supplied to the engine and by the engine rotational speed. The control means 10 in the device for purifying exhaust gas according to the illustrated embodiment has an internal memory (not shown) which stores a map of exhaust gas temperature regions using the engine rotational speed and the engine load as parameters as shown in FIG. 5, and detects in which region the exhaust gas temperature now lies from the engine rotational speed and the fuel injection amount (load). The region referred to here is a region of the temperature of the exhaust gas discharged from the cylinder.

The boundary lines of areas X, Y and Z shown in FIG. 5 are set by chiefly making reference to the experimental results related to the exhaust gas temperature of the engine and the active temperature region of the oxidizing catalyst 12 at the time of defining the map. The region X is a region where the temperature is higher than the active temperature region of the oxidizing catalyst 12, the region Y is a region where the temperature lies in the active temperature region of the oxidizing catalyst 12, and the region Z is a region where the temperature is lower than the active temperature region of the oxidizing catalyst 12.

It needs not be pointed out that the boundary lines can be appropriately changed by the user depending on the operation characteristics of the diesel engine that is used and the characteristic properties of the catalyst that is used. The above temperature regions need not necessarily be limited to three regions, but maybe divided into more regions or may be defined to be two regions.

Figure 8:
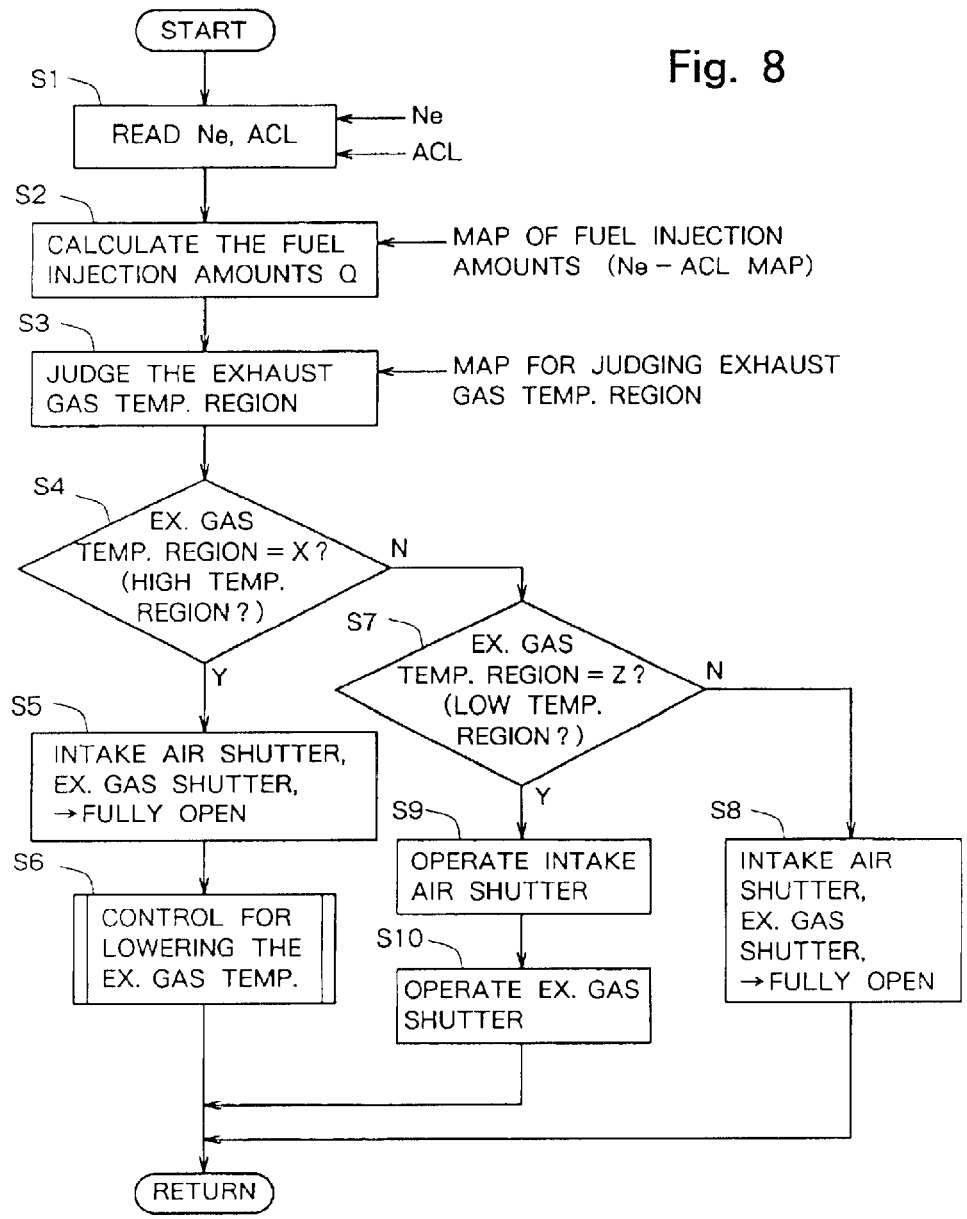
FIG. 8 is a flowchart illustrating the control operation by a control means of the present invention.

Next, the operation of the device for purifying exhaust gas according to the embodiment of FIG. 1 will be described with reference to a flowchart illustrated in FIG. 8. At the start (key on) of the engine, the intake air shutter has been opened and, hence, consideration has been so given that the starting performance is made not worse. When the engine starts operating (after the start of the engine), the control operation of the flowchart starts feeding the fuel to the engine from a fuel injection device that is not shown. The control means 10 reads an engine rotational speed signal (Ne) and an accelerator opening degree signal (ACL) from the engine rotational speed sensor 15 and the accelerator sensor 16 (step S1), and makes reference to a map of fuel injection amounts (not shown) to determine an amount of fuel injection (step S2). The control means 10 detects the amount of fuel injection at this moment as a load Q for the engine.

In the device for purifying exhaust gas according to the embodiment of FIG. 1, when the engine load Q has been detected as described above, the control means 10 detects the present exhaust gas temperature region from the map of exhaust gas temperature regions shown in FIG. 5 based on the engine load and the engine rotational speed that has been detected as described above (step S3). After having thus detected the present exhaust gas temperature region, the control means 10 controls the intake air shutter 9 and the exhaust gas shutter 11 based on the present exhaust gas temperature region in compliance with a control map shown in FIG. 6.

Figure 7A:
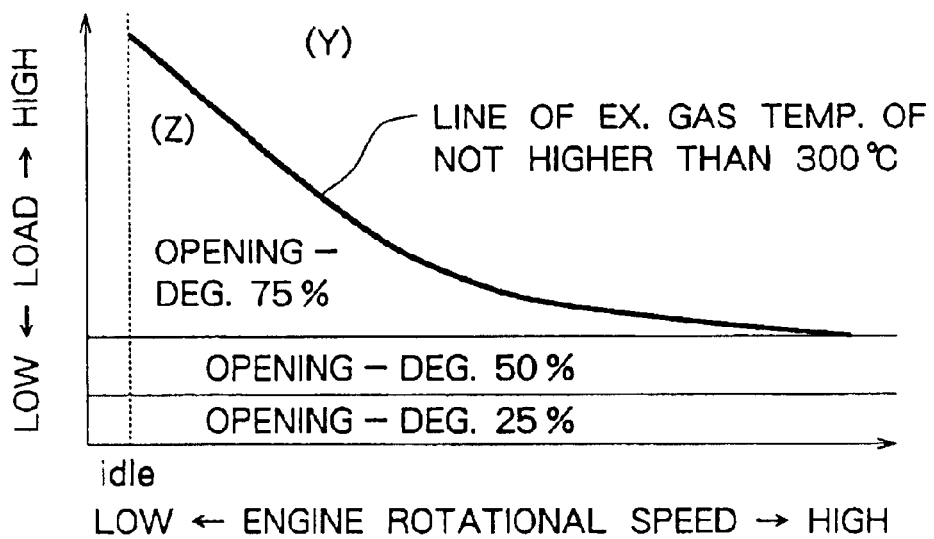
FIGS. 7A and 7B are maps for controlling, respectively, the opening degrees of an intake air shutter and the opening degrees of an exhaust gas shutter according to the present invention.
Figure 7B:
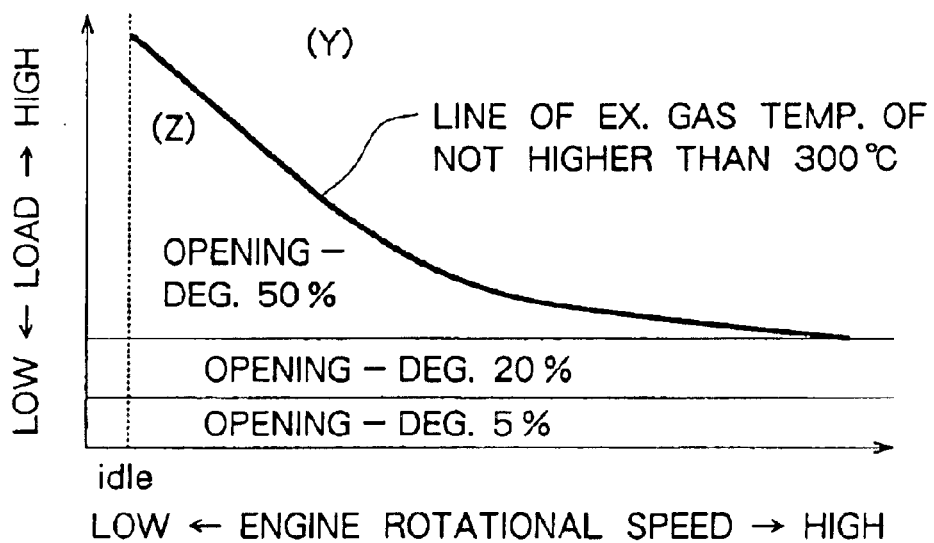

First, when the exhaust gas temperature region is in the active temperature region X of the oxidizing catalyst (step S4), the control means 10 fully opens the intake air shutter 9 and the exhaust gas shutter 11 according to the control maps of FIGS. 7A and 7B (step S5). The control means 10, then, executes the control operation for lowering the exhaust gas temperature (step S6). The control operation for lowering the exhaust gas temperature may be executed by, for example, a means for cooling the exhaust gas by using a cooling water or by separately providing a means for increasing the amount of the intake air, such as a mechanical supercharger. The control operation for lowering the exhaust gas temperature is not a principal constituent requirement of the present invention and hence, is not described here.

When the exhaust gas temperature region is other than the region X at step S4, the control means 10 proceeds from step S4 to step S7 to judge whether or not the exhaust gas temperature region is the low temperature region Z. When it is judged that the region is not the low temperature region (but is the exhaust gas temperature region=Y), then, the control means 10 proceeds to step S8 to fully open the intake air shutter 9 and the exhaust gas shutter 11.

When it is judged at step S7 that the exhaust gas temperature region is the low temperature region (exhaust gas temperature region=Z), the control means 10 proceeds to step S9 to operate the intake air shutter 9 thereby to squeeze the shutter 9 based on the map of intake air shutter opening degrees of FIG. 7($a$). The control means 10, then, proceeds to step S10 to operate the exhaust gas shutter 11 thereby to squeeze the shutter 11 based on the map of exhaust gas shutter opening degrees of FIG. 7($b$). The maps shown in FIGS. 7($a$) and 7($b$) are the ones in which the region Z of the map used for the exhaust gas temperature region detecting means shown in FIG. 5 is further divided to set stepwise the respective operation for opening the intake and exhaust gas shutters. The word "opening degree 20%" means that the shutter is closed by 80% with respect to the fully opened position, and "opening degree 5%" means that it is closed by 95%.

After having performed the above control operation, the control flowchart returns back to the start.

In the illustrated embodiment, the exhaust gas valve 40 is opened during the intake stroke due to the action of the exhaust gas introduction cam profile 422 of the exhaust cam 42 that constitutes the exhaust gas introduction mechanism shown in FIG. 2, and the exhaust gas is introduced into the cylinder. When the exhaust gas introduction mechanism 50 shown in FIG. 4 is provided, further, the electromagnetic solenoid 52 is driven during the intake stroke, and the exhaust gas introduction valve 51 is opened to introduce the exhaust gas into the cylinder. When the exhaust gas temperature region is in the low-temperature region (exhaust gas temperature region=Z) as described above, the exhaust gas of a high temperature flowing through the exhaust gas passage is caused to flow back into the cylinder during the intake stroke. As a result, the exhaust gas temperature is raised. Further, when the exhaust gas shutter is controlled to close as described above, the exhaust gas pressure in the exhaust gas passage is in an elevated state with the consequence that the exhaust gas flowing back into the cylinder increases and it becomes possible to further raise the exhaust gas temperature. When the exhaust gas temperature region is in the low-temperature region (exhaust gas temperature region=Z), therefore, the control operation for squeezing the intake air shutter 9, the control operation for squeezing the exhaust gas shutter 11 and the operation of the exhaust gas introduction mechanism work as exhaust gas temperature-raising means for raising the exhaust gas temperature of the engine.

Figure 9:
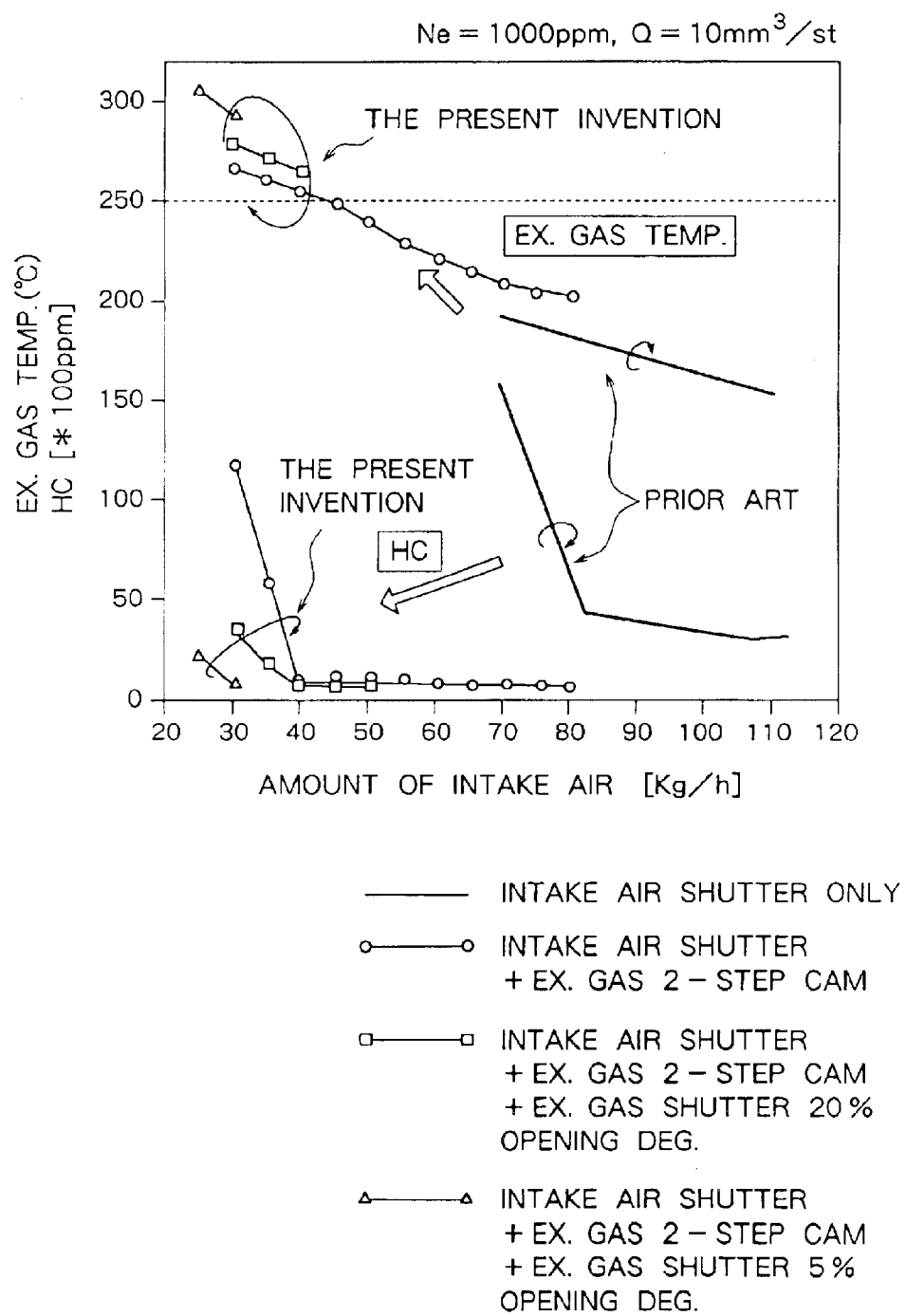
FIG. 9 is a graph illustrating the effects of the intake air shutter, an exhaust two-step cam and the exhaust gas shutter.

Effects in the concrete will be described with reference to a graph of FIG. 9. When the intake air shutter and the exhaust gas introduction mechanism that introduces the exhaust gas during the intake stroke (exhaust two-step cam mechanism) are operated (represented by lines coupled with circle symbols), the amount of HC emission does not almost increase even when the amount of the intake air is squeezed down to about 40 kg/h and further, the exhaust gas temperature exceeds 250° C., in contrast with the exhaust gas temperature and amount of HC emission represented by solid lines of the conventional cases where the intake air shutter only is operated. And, when the amount of the intake air is further squeezed, HC emission becomes worse. In this case, however, when the exhaust gas shutter was operated (opening degree of 20%, represented by a line coupled with square symbols), the exhaust gas temperature could be further raised and the concentration of HC emission could be decreased. Further, in case the amount of the intake air was to be further squeezed down to 30 kg/h or smaller, when the exhaust gas shutter was further squeezed (opening degree of 5%, represented by a line coupled with triangle symbols), the exhaust gas temperature exceeded 300° C. and the HC emission could be further decreased.

In the illustrated embodiments as described above, the exhaust gas temperature region is detected based on the engine rotational speed and the load. Not being limited thereto only, however, the exhaust gas temperature region may be detected by using the exhaust gas temperature sensor 8 that is provided directly in the exhaust pipe 7 of the engine. Further, though in the illustrated embodiments, the continuous regeneration type DPF has been described to be constituted by the oxidizing catalyst and the DPF as separate constituents, it needs not be pointed out that the present invention can similarly be applied even to a continuous regeneration type DPF in which a DPF directly carries a material that works as an oxidizing catalyst and is constituted as a unitary structure, to a continuous regeneration type DPF in which a DPF carries a NOx occluding/reducing catalyst, and to a continuous regeneration type DPF using a catalyst which effectively works in a limited temperature region only.

Industrial Applicability

According to the device for purifying exhaust gas of diesel engines of the present invention, when the exhaust gas temperature is lower than the active temperature region of the catalyst, the intake air shutter is operated to decrease the amount of the intake air and, at the same time, the exhaust gas passage is allowed to open into the cylinder during the intake stroke so that the exhaust gas flows back therein, making it possible to raise the exhaust gas temperature while suppressing the emission of HC without making the combustion worse. The effect can be further enhanced by operating the exhaust gas shutter. Accordingly, the device can be effectively applied particularly to the diesel engines mounted on the vehicles.

What is claimed is:

1. A device for purifying exhaust gas of a diesel engine having an intake air passage and an exhaust gas passage, the exhaust gas passage being equipped with a continuous regeneration type diesel particulate filter system, including a diesel particulate filter and a catalyst upstream of the diesel particulate filter, said device comprising:

an intake air shutter arranged in the intake air passage of the engine;

an exhaust gas temperature region detecting means for detecting an exhaust gas temperature region of the engine;

a control means for squeezing the opening degree of said intake air shutter when the exhaust gas temperature region of the engine, detected by said exhaust gas temperature region detecting means, is lower than a predetermined temperature region; and an exhaust valve-operating mechanism equipped with an exhaust gas introduction mechanism for opening the exhaust valve of the engine for a short period of time during the intake stroke.

2. A device for purifying exhaust gas of a diesel engine according to claim 1, wherein when the exhaust gas temperature region of the engine, detected by said exhaust gas temperature region detecting means, is lower than a predetermined temperature region, said control means controls stepwise so as to decrease the opening degree of said intake air shutter as the temperature region becomes low.

3. A device for purifying exhaust gas of a diesel engine according to claim 1, wherein an exhaust gas shutter arranged in the exhaust gas passage and for squeezing said exhaust gas passage is provided, and said control means controls so as to squeeze the opening degree of said exhaust gas shutter when the exhaust gas temperature region detected by said exhaust gas temperature region detecting means is in a low temperature region.

4. A device for purifying exhaust gas of a diesel engine according to claim 3, wherein when the exhaust gas temperature region of the engine, detected by said exhaust gas temperature region detecting means, is lower than a predetermined temperature region, said control means controls stepwise so as to decrease the opening degree of said exhaust gas shutter as the temperature region becomes low.

5. A device for purifying exhaust gas of a diesel engine having an intake air passage and an exhaust gas passage, the exhaust gas passage being equipped with a continuous regeneration type diesel particulate filter system, including a diesel particulate filter and a catalyst upstream of the diesel particulate filter, said device comprising:

an intake air shutter arranged in the intake air passage of the engine;

an exhaust gas introduction mechanism for opening the exhaust gas passage to the cylinder for a short period of time during the intake stroke;

an exhaust gas temperature region detecting means for detecting an exhaust gas temperature region of the engine; and a control means for squeezing the opening degree of the intake air shutter and for operating said exhaust gas introduction mechanism when the exhaust gas temperature region of the engine, detected by said exhaust gas temperature region detecting means, is lower than a predetermined temperature region.

6. A device for purifying exhaust gas of a diesel engine according to claim 5, wherein when the exhaust gas temperature region of the engine, detected by said exhaust gas temperature region detecting means, is lower than a predetermined temperature region, said control means controls stepwise so as to decrease the opening degree of said intake air shutter as the temperature region becomes low.

7. A device for purifying exhaust gas of a diesel engine according to claim 5, wherein an exhaust gas shutter arranged in the exhaust passage and for squeezing said exhaust gas passage is provided, and said control means controls so as to squeeze the opening degree of said exhaust gas shutter when the exhaust gas temperature detected by said exhaust gas temperature region detecting means is in a low temperature region.

8. A device for purifying exhaust gas of a diesel engine according to claim 7, wherein when the exhaust gas temperature region of the engine, detected by said exhaust gas temperature region detecting means, is lower than a predetermined temperature region, said control means controls stepwise so as to decrease the opening degree of said exhaust gas shutter as the temperature region becomes low.

9. A device for purifying exhaust gas of a diesel engine having an intake air passage and an exhaust gas passage, the exhaust gas passage being equipped with a continuous regeneration type diesel particulate filter system, including a diesel particulate filter and a catalyst upstream of the diesel particulate filter, said device comprising:

an intake air shutter arranged in the intake air passage of the engine;

an exhaust gas temperature detector for detecting the temperature of the exhaust gas;

a controller responsive to the detected exhaust gas temperature being within a predetermined temperature region, for controlling the opening degree of said intake air shutter to squeeze the intake air passage; and an exhaust valve-operating mechanism equipped with an exhaust gas introduction mechanism for opening an exhaust valve of a cylinder of the diesel engine for a short period of time during the intake stroke of the cylinder to introduce exhaust gas into the cylinder.

10. A device for purifying exhaust gas of a diesel engine according to claim 9, wherein said controller is responsive to the position of the detected exhaust gas temperature within the predetermined temperature region, to stepwise further decrease the opening degree of said intake air shutter, so as to further squeeze the intake air passage, as the detected temperature becomes lower.

11. A device for purifying exhaust gas of a diesel engine according to claim 9, further comprising an exhaust gas shutter arranged in the exhaust gas passage for squeezing said exhaust gas passage, and wherein said controller is responsive to the detected exhaust gas temperature being within the predetermined temperature region, to control the opening degree of said exhaust gas shutter so as to squeeze the exhaust gas passage.

12. A device for purifying exhaust gas of a diesel engine according to claim 11, wherein said controller is responsive to the position of the detected exhaust gas temperature within the predetermined temperature region, to stepwise further decrease the opening degree of said exhaust gas shutter, so as to further squeeze the exhaust gas passage, as the detected temperature becomes lower.

13. A device for purifying exhaust gas of a diesel engine having an intake air passage and an exhaust gas passage, the exhaust gas passage being equipped with a continuous regeneration type diesel particulate filter system, including a diesel particulate filter and a catalyst upstream of the diesel particulate filter, said device comprising:

an intake air shutter arranged in the intake air passage of the engine;

an exhaust gas introduction mechanism for opening the exhaust gas passage to a cylinder of the diesel engine during a portion of the intake stroke of the cylinder;

an exhaust gas temperature detector for detecting the temperature of the exhaust gas; and a controller responsive to the detected exhaust gas temperature being within a predetermined temperature region, for controlling the opening degree of said intake air shutter to squeeze the intake air passage, and for operating said exhaust gas introduction mechanism.

14. A device for purifying exhaust gas of a diesel engine according to claim 13, wherein said controller is responsive to the position of the detected exhaust gas temperature within the predetermined temperature region, to stepwise further decrease the opening degree of said intake air shutter, so as to further squeeze the intake air passage, as the detected temperature becomes lower.

15. A device for purifying exhaust gas of a diesel engine according to claim 13, further comprising an exhaust gas shutter arranged in the exhaust gas passage for squeezing said exhaust gas passage, and wherein said controller is responsive to the detected exhaust gas temperature being within the predetermined temperature region, to control the opening degree of said exhaust gas shutter so as to squeeze the exhaust gas passage.

16. A device for purifying exhaust gas of a diesel engine according to claim 15, wherein said controller is responsive to the position of the detected exhaust gas temperature within the predetermined temperature region, to stepwise further decrease the opening degree of said exhaust gas shutter, so as to further squeeze the exhaust gas passage, as the detected temperature becomes lower.

* * * * *